(12) United States Patent
Chung et al.

(10) Patent No.: US 8,111,007 B2
(45) Date of Patent: Feb. 7, 2012

(54) ELECTRONIC DEVICE CAPABLE OF CONTROLLING LED BRIGHTNESS AND METHOD THEREOF

(75) Inventors: Shin-Hong Chung, Taipei Hsien (TW); Sha-Sha Hu, Shenzhen (CN); Zhi-Guo Li, Shenzhen (CN); Jui-Lin Ke, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 300 days.

(21) Appl. No.: 12/406,054

(22) Filed: Mar. 17, 2009

(65) Prior Publication Data
US 2009/0237005 A1     Sep. 24, 2009

(30) Foreign Application Priority Data
Mar. 21, 2008 (CN) .......................... 2008 1 0066156

(51) Int. Cl.
*H05B 37/02* (2006.01)
(52) U.S. Cl. ......... 315/291; 315/295; 315/307; 315/312
(58) Field of Classification Search .............. 315/185 R, 315/291, 294, 295, 297, 307, 308, 312, 360; 345/84, 204
See application file for complete search history.

(56) References Cited

U.S. PATENT DOCUMENTS

| | | | |
|---|---|---|---|
| 7,259,525 B2* | 8/2007 | Yang | 315/291 |
| 2005/0110469 A1* | 5/2005 | Inaba et al. | 323/222 |
| 2008/0042548 A1* | 2/2008 | Sugimoto | 313/495 |
| 2008/0129220 A1* | 6/2008 | Shteynberg et al. | 315/291 |
| 2009/0033243 A1* | 2/2009 | Gater | 315/291 |
| 2009/0079360 A1* | 3/2009 | Shteynberg et al. | 315/291 |

* cited by examiner

*Primary Examiner* — Tung X Le
(74) *Attorney, Agent, or Firm* — Altis Law Group, Inc.

(57) ABSTRACT

An electronic device capable of controlling light-emitting diode (LED) bright is provided. The electronic device includes a signal producing unit for producing an operation signal; a Micro Control Unit (MCU) configured for outputting a normal brightness control signal according to the operation signal, and outputting a ultra brightness control signal according to the operation signal when an actual idle time of the electronic device reaches or exceeds a predetermined idle time; a pulse current control unit for controlling an output current according to the normal brightness control and the ultra brightness control signal; and a LED illuminator array for emitting light based on the output current. The MCU terminates the output of the ultra brightness control signal when an actual time of outputting the ultra brightness control signals reaches a predetermined time, and then the LED illuminator array resumes its normally bright. A control method is also provided.

12 Claims, 5 Drawing Sheets

ELECTRONIC DEVICE CAPABLE OF CONTROLLING LED BRIGHTNESS AND METHOD THEREOF

FIELD OF THE INVENTION

The disclosure relates to an electronic device and method for controlling light-emitting diode (LED), particularly to an electronic device and method for controlling LEDs to emit ultra bright light at certain time intervals.

GENERAL BACKGROUND

LEDS and LED illuminator arrays are utilized for backlights in liquid crystal displays (LCDs) due to their dimming range, low temperature performance, and efficient heat-sinking attributes.

The brightness of conventional LEDs and LED illuminator arrays can be varied. However, in certain circumstances, such as billboards, it may be desirable that LEDs in backlight components of product displays emit ultra bright light to display images. A typical circuit for driving an LED illuminator array to emit ultra bright light includes a frequency generator and a pulse current control unit. The frequency generator controls the pulse current control unit to generate a large current in excess of rated current of the LED illuminator array to drive the LED illuminator array to emit ultra bright light. Because the circuit controls the LED illuminator array to continuously emit ultra bright light, the life of the LED illuminator array is greatly reduced.

Therefore, it is necessary to provide an electronic device and method which can overcome the above-mentioned problem.

DETAILED DESCRIPTION OF THE EMBODIMENTS

Figure 1:
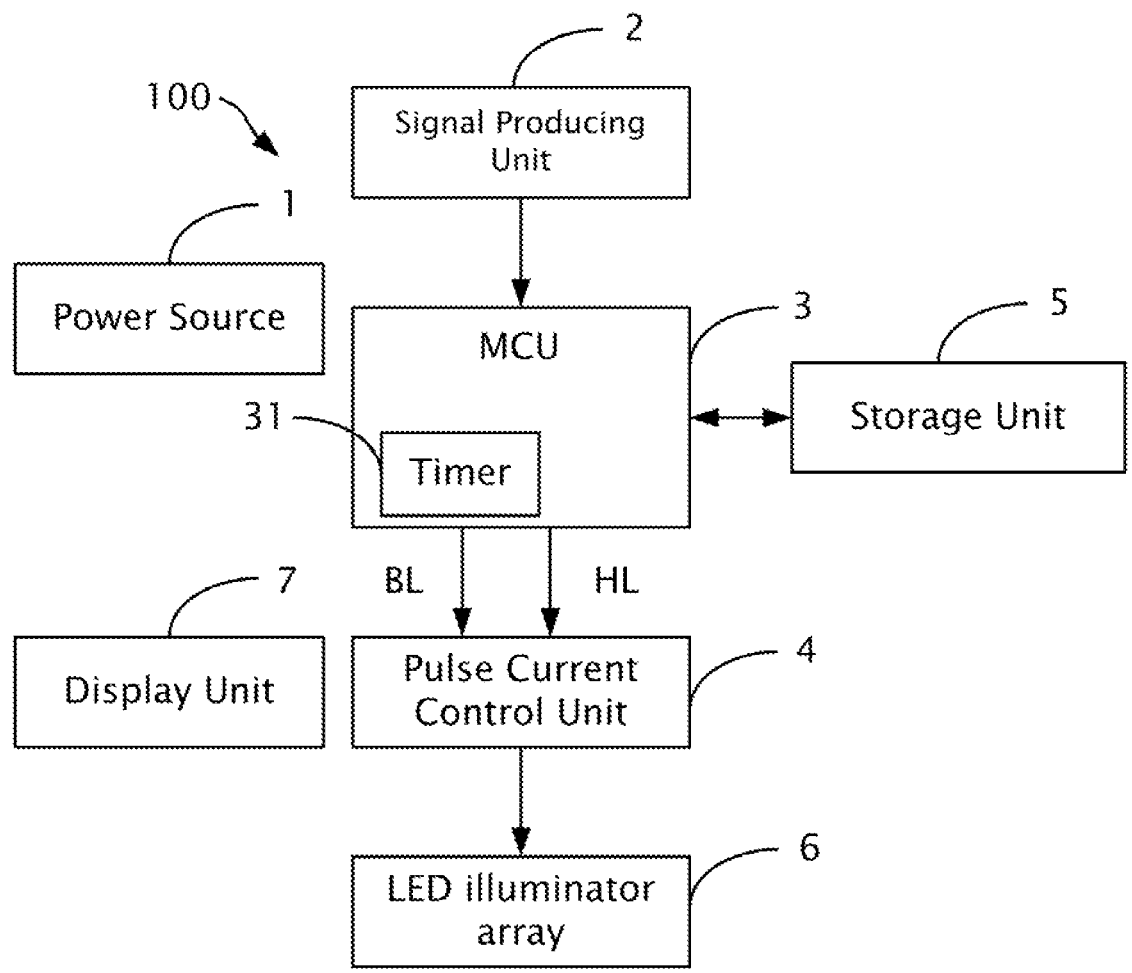
FIG. 1 is a block diagram of an electronic device capable of controlling brightness of LEDs in accordance with a first embodiment.

FIG. 1 is a block diagram of an electronic device 100 which is capable of controlling brightness of LEDs in accordance with an exemplary embodiment. The electronic device 100 includes a power source 1, a signal producing unit 2, a micro control unit (MCU) 3, a pulse current control unit 4, a storage unit 5, a LED illuminator array 6 and a display unit 7. The power source 1 is configured for providing various voltages to the components of the electronic device 100. The signal producing unit 2 may be anyone of various of input devices, such as a keyboard, a mouse, touch panels and interfaces including those configured for receiving memory cards and those configured for connecting the electronic device 100 to another electronic devices. The signal producing unit 2 is configured for providing operational signals to the MCU 3 when the signal producing unit is operated by a user. The operational signals accordingly may be keyboard signals, mouse signals, touch signals or interface connected signals. The MCU 3 is configured for outputting a normal brightness control signal BL according to the operational signals from the signal producing unit 2. The pulse current controlling unit 4 is configured for receiving the normal brightness control signal BL and accordingly outputting a current to the LED illuminator array 6. The LED illuminator array 6 includes a plurality of LEDs connected in series and the LEDs are driven by the LED current to emit light. The storage unit 5 is configured for storing various parameters and procedures. The display unit 7 is configured for displaying data of the electronic device 100.

In the exemplary embodiment, the various parameters stored in the storage unit 5 comprise a predetermined output time of an ultra brightness control signal and a predetermined idle time. The MCU 3 includes a timer 31, which is used to measure idle time during which the MCU 3 doesn't receive any operational signal from the signal producing unit 2. The idle time is compared with the predetermined idle time by the MCU 3 to determine whether to respond to a newly received operational signal.

If the operational signal is received when or after the idle time reaches or exceeds the predetermined idle time, the MCU 3 outputs both a normal brightness control signal BL and an ultra brightness control signal HL to the pulse current control unit 4. The normal brightness control signal BL and the ultra brightness control signal may be a high level signal and a pulse-width modulation (PWM) signal. Correspondingly, the pulse current control unit 4 provides a large current in excess of a rated current of the LED illuminator array 6 in accordance with both with the normal brightness control signal BL and the ultra brightness control signal HL. The large current drives the LED illuminator array 6 to emit ultra bright light. Otherwise, if the operational signal is received before the idle time has reached the predetermined idle time, the MCU 3 does not send the ultra brightness control signal HL, thus the useful life of the LED illuminator array 6 is prolonged.

The MCU 3 also controls the timer 31 to measure the output time of the ultra brightness control signal HL. When the output time of the ultra brightness control signal HL has reached the predetermined output time, the MCU 3 terminates the output of the ultra brightness control signal HL, but continues the output of the normal brightness control signal BL. The pulse current control unit 4 correspondingly outputs a normal current according to the normal brightness signal BL to light the LED illuminator array 6.

In an alternative embodiment, the electronic device 100 can be set to enter into a sleep mode after the MCU 3 outputs the normal brightness control signal BL for a predetermined time, thereby saving power of the battery of the electronic device 100.

Figure 2:
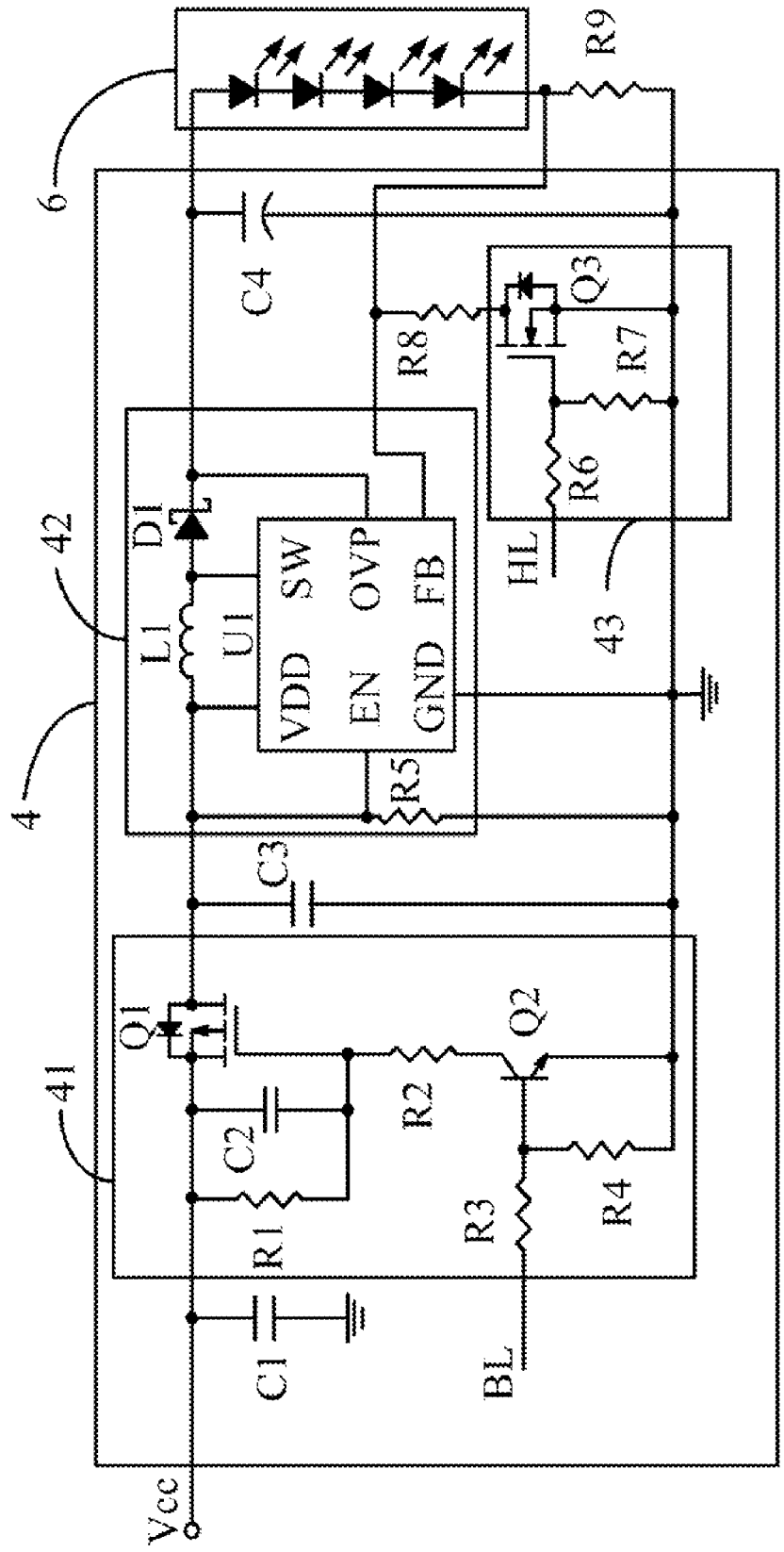
FIG. 2 is a circuit of a pulse current control unit and a LED illuminator array.

FIG. 2 is a circuit of a pulse current controlling unit 4 connected with the LED illuminator array 6. A voltage Vcc from the power source 1 is provided to the pulse current control unit 4 to drive the LED illuminator array 6. R9 is a LED current sensing element connected between the output terminal of the LED illuminator array 6 and ground. The current control unit 4 obtains a feedback signal from the output of the LED illuminator array 6.

The pulse current control unit 4 includes a first switch unit 41, a DC-DC converting circuit 42, and a second switch unit 43. The first switch unit 41 turns on and off alternately according to the normal brightness control signal, thereby outputting an acceptable voltage to the DC-DC converting circuit 42.

The DC-DC converting circuit 42 converts the acceptable voltage to a LED drive voltage to drive the LED illuminator array 6.

The second switch unit 43 turns on and off alternately according to the ultra brightness control signal HL provided by the MCU 3. When the second switch unit 43 is turned on, a first resistor R8 is in parallel with the resistor R9, resulting in an increase in current flowing through the LED illuminator array 6, and the LED illuminator array 6 emitting ultra bright light.

The first switch unit 41 includes an enhanced p-channel metal oxide semiconductor field effect transistor Q1 (hereinafter "MOSFET Q1"), a bipolar junction transistor Q2 (hereinafter "BJT Q2"), a capacitor C2 and a plurality of resistors R1, R2, R3 and R4. The MOSTET Q1 is connected to the power source 1 and obtained a voltage Vcc from the power source 1. A filter capacitor C1 is connected between the source electrode and the gate electrode of the MOSFET Q1, and is used to filter the voltage Vcc. The resistor R1 is parallel with the capacitor C2 between the source electrode and the gate electrode of the MOSFET Q1, and is further connected to the collector of the BJT Q2 through the resistor R2. The emitter of the BJT Q2 is connected to ground, and the base of the BJT Q2 is connected to the emitter through the resistor R4.

The normal brightness control signal BL is used to control the MOSFET Q1 to turn on and off alternately through the BJT Q2. When the BJT Q2 is turned on by the normal brightness control signal BL, the MOSFET Q1 is sequentially turned on because its gate electrode potential is pulled low by the BJT Q2, thereby converting the voltage Vcc to an acceptable voltage to drive the DC-DC converting circuit 42.

The DC-DC converting circuit 42 includes a DC-DC converter U1 (hereinafter "the converter U1") and a zener diode D1. The converter U1 converts the acceptable voltage to a LED drive voltage suitable for lighting the LED illuminator array 6. Filter capacitors C3 and C4 are respectively connected to the input and the output of the converter U1 to filter the acceptable voltage and the LED drive voltage.

The converter U1 includes a voltage supply pin VDD, an enable pin EN, a ground pin GND, a switch output pin SW, an over voltage protection pin OVP and a feedback pin FB. The pin VDD receives the acceptable voltage from the drain electrode of the MOSFET Q1. The pin EN is connected to the drain electrode of the MOSFET Q1, and is also connected to ground through a resistor R5. The pin GND is connected to ground. The pin SW is connected to the anode of the zener diode D1. The cathode of the zener diode D1 is connected to the pin OVP. An inductor L1 is connected between the pin VDD and the anode of the zener diode D1. The pin FB is connected to the output of the LED illuminator array 6 and receives feedback of LED current through the resistor R9 for the converter U1 controlling the LED drive voltage of the LED illuminator array 6.

The output voltage of the pin SW of the DC-DC convertor U1 is rectified by the zener diode D1 and then is applied to turn on the LED illuminator array 6.

If the normal brightness control signal BL is a PWM signal, the brightness of the LED illuminator array 6 can be varied by changing one or more features of the PWM signal. For example, increasing the duty cycle of the PWM signal increases the LED drive voltage output by the DC-DC convertor U1 through the zener diode D1, and therefore increases the brightness of the LED illuminator array 6.

The second switch unit 43 includes an enhanced n-channel metal oxide semiconductor field effect transistor Q3 (hereinafter "MOSFET Q3"). The gate electrode of the MOSFET Q3 is connected to ground through a resistor R7, the source electrode of the MOSFET Q3 is connected to ground, the drain electrode of the MOSFET Q3 is connected to the LED illuminator array 6 and the resistor R9 through the first resistor R8. The ultra brightness control signal is provided to the gate electrode of the MOSFET Q3 through a resistor R6 to control the MOSFET Q3 to turn on and off alternately.

When the MOSFET Q3 is turned off, it is an open circuit to the resistor R8, and the first resistor R8 is disconnected from ground. When the MOSFET Q3 is turned on, the source to drain resistance is small enough to be considered as zero for all practical purposes, therefore, the first resistor R8 is connected to ground through the MOSFET Q3. Thus the first resistor R8 is in parallel with the resistor R9, and the LED current flowing through the LED illuminator array 6 increases, and causing the LED illuminator array 6 to emit ultra bright light.

Figure 3:
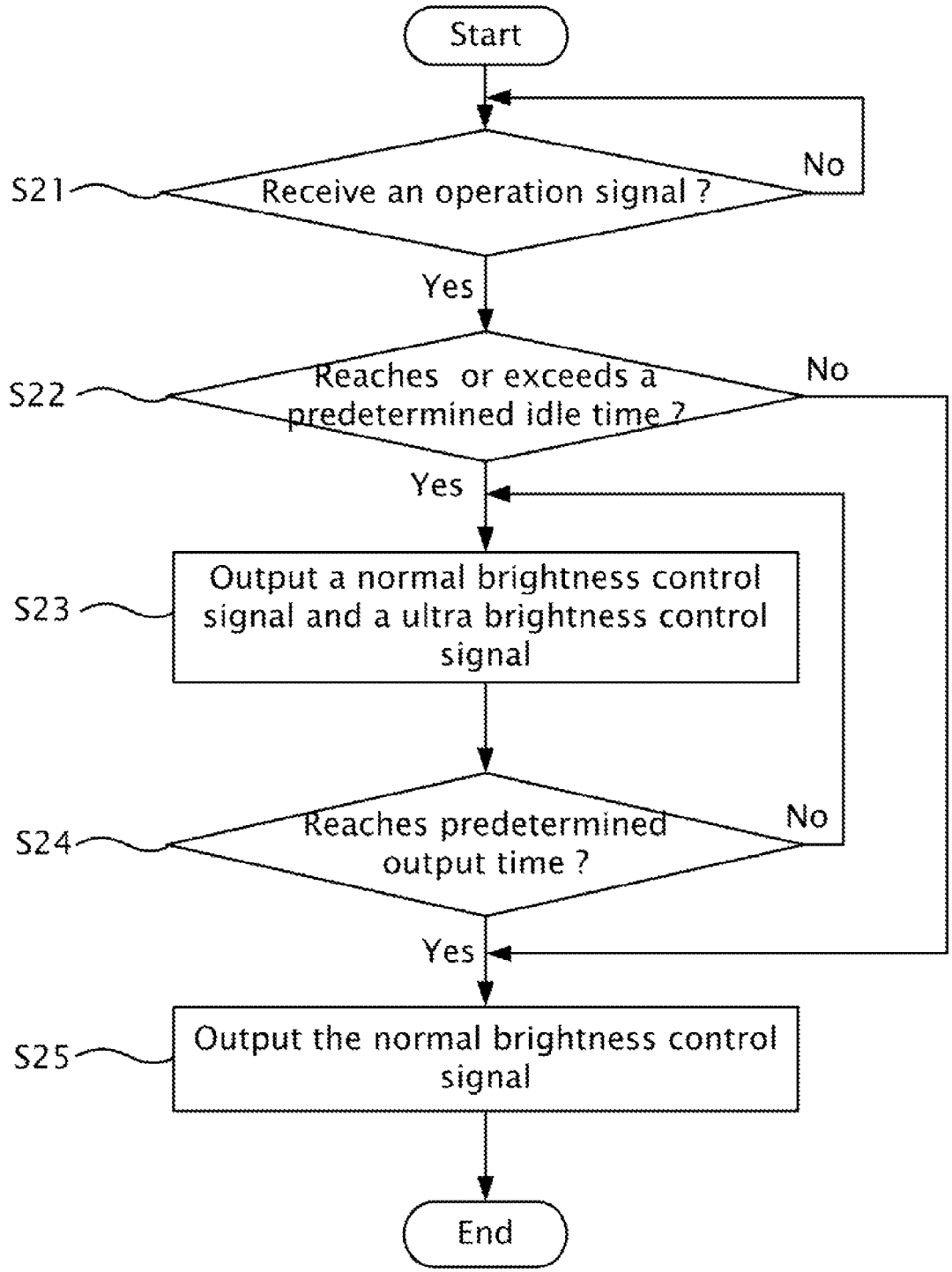
FIG. 3 is a flow chart of an exemplary method for LED brightness control of the electronic device of FIG. 1.

FIG. 3 is a flow chart of an exemplary method for LED brightness controlling of the electronic device 100 of FIG. 1. Firstly, in step S21, the MCU 3 determines whether any operational signal produced by the signal producing unit 2 is received. Step S21 is repeated until the MCU 3 receives an operational signal from the signal producing unit 2 and the procedure goes to step S22. In step S22, the MCU 3 determines whether the actual idle time measured and provided by the timer 31 reaches or exceeds the predetermined idle time. If the actual idle time has not reached the predetermined idle time, the procedure goes into step S25, in which the MCU 3 outputs a normal brightness control signal BL to the pulse current controlling unit 4. If the actual idle time has reached or exceeded the predetermined idle time, the procedure goes to step S23, in which the MCU 3 outputs both a normal brightness control signal BL and an ultra brightness control signal HL to the pulse current controlling unit 4. In step S23 the MCU 3 also controls the timer 31 to measure the output time of the ultra brightness control signal HL. In step S24, the MCU 3 determines whether the output time of the ultra brightness control signal HL has reached the predetermined output time. If the output time has reached the predetermined output time, the procedure goes to step S25, in which the MCU 3 terminates the output of the ultra brightness control signal HL, but continues the output of normal brightness control BL. If the output time has not reached the predetermined output time, the procedure returns to step S23.

Figure 4:
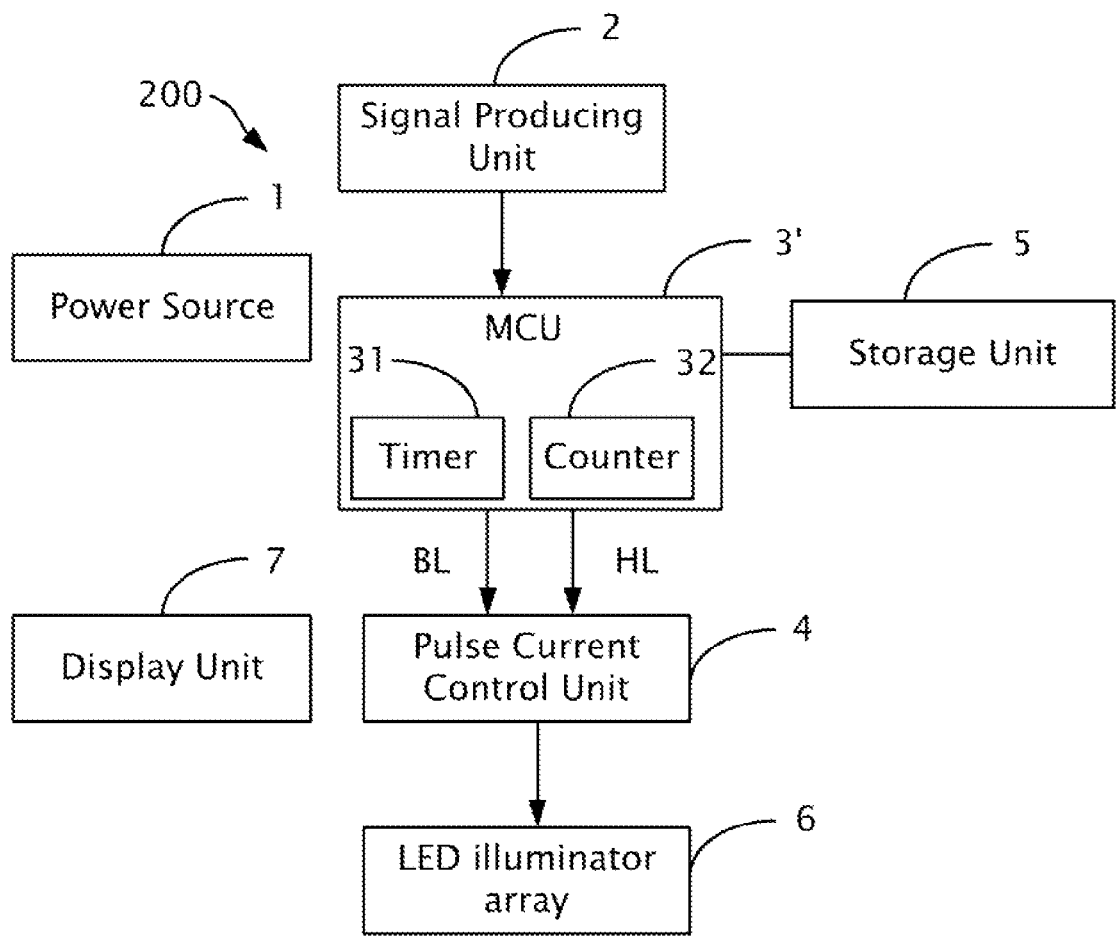
FIG. 4 is a block diagram of an electronic device capable of controlling LED brightness in accordance with a secondary exemplary embodiment.

FIG. 4 is a block diagram of an electronic device 200 capable of controlling LED bright in accordance with a secondary exemplary embodiment. Compared with the electronic device 100, a MCU 3' of the electronic device 200 further includes a counter 32. The MCU 3' controls the counter 32 to count actual number of times of outputting the ultra brightness control signal HL during a predetermined time interval. Correspondingly, the storage unit 5 stores a predetermined number of times of outputting the ultra brightness control signal HL to limit the actual number of times of outputting the ultra brightness control signal HL during the predetermined time interval. The predetermined number of times may be, for example, 10 in a time interval of 24 hours.

When the MCU 3' receives an operational signal from the signal producing unit 2, the MCU 3' firstly determines whether the actual number of times of outputting the ultra brightness control signal HL in the predetermined time interval has reached the predetermined number of times; if the actual number of times has not reached the predetermined number of times, the MCU 3' outputs both the normal brightness control signal BL and the ultra brightness control signal HL to the pulse current control unit 4 to increase an amount of the current in the LED illuminator array 6, thereby the LED illuminator array 6 emits ultra bright light. If the actual number of times has reached the predetermined number of times, the MCU 3' only outputs the normal brightness control signal to the pulse current control unit 4, thereby maintaining the normal brightness of the LED illuminator 6.

Figure 5:
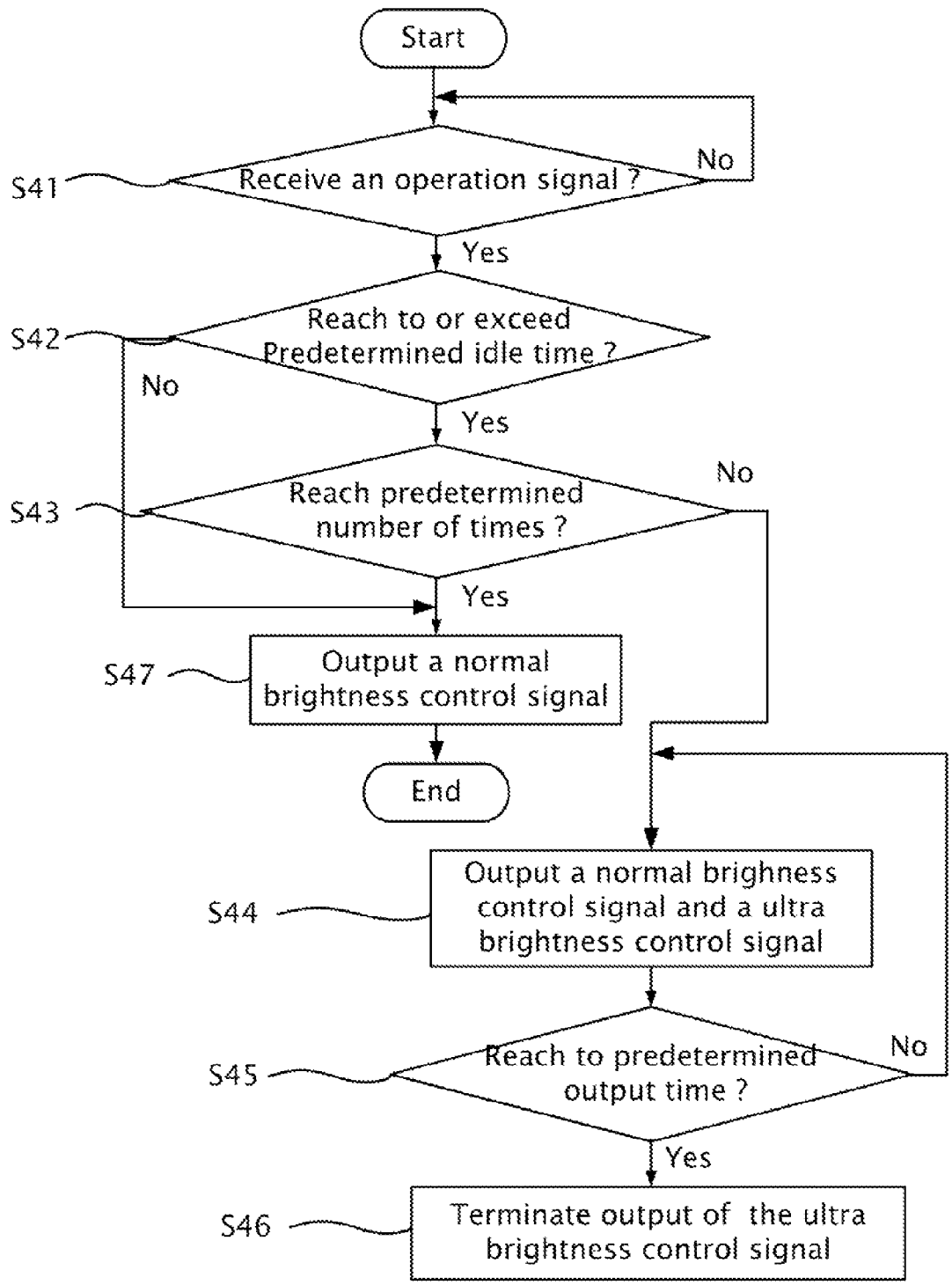
FIG. 5 is a flow chart of another exemplary method for LED brightness control of the electronic device of FIG. 4.

FIG. 5 is a flow chart of an exemplary method for LED brightness controlling of the electronic device 200 of FIG. 4. Firstly, in step S41, the MCU 3 determines whether any operational signal from the signal producing unit 2 is received. Step S41 is repeated until the MCU 3' receives an operational signal from the signal producing unit 2 and the procedure goes to step S42. In step S42, the MCU 3' determines whether the actual idle time measured and provided by the timer 31 reaches or exceeds the predetermined idle time. If the actual idle time has not reached the predetermined idle time, the procedure goes to step S47, in which the MCU 3' outputs a normal brightness control signal BL to the pulse current controlling unit 4. If the actual idle time has reached or exceeded the predetermined idle time, the procedure goes to step S43, in which the MCU 3' determines whether the actual number of times of outputting the ultra brightness control signal HL counted by the counter 32 has reached the predetermined number of times. If the actual number of times of outputting the ultra brightness control signal HL has reached the predetermined number of times, the procedure goes to the step S47. If the actual number of times of outputting the ultra brightness control signal HL has not reached the predetermined output times, the procedure goes to step S44, in which the MCU 3' outputs both a normal brightness control signal BL and an ultra brightness control signal HL to the pulse current controlling unit 4. In step S44 the MCU 3' also controls the timer 31 to measure the output time of the ultra brightness control signal. In step S45, the MCU 3' determines whether the actual times of outputting the ultra brightness control signal HI has reached the predetermined times. If the actual times reaches the predetermined times, the procedure goes to step S46, in which the MCU 3' terminates the output of ultra brightness control signal HL, but continues the output of the normal brightness control BL. If the actual times does not reach the predetermined times, the procedure returns to step S44.

Based on the preferred embodiments disclosed above, an advantage of the present invention over the prior art becomes clear. The advantage is that the electronic device can control the LED illuminator array 6 to emit ultra bright light temporarily according to a schedule limiting the actual number of times of the LED illuminator array 6 emits ultra bright light during a predetermined time interval, thus saving energy and prolonging the life of the electronic devices 100 and 200.

Although the present disclosure has been specifically described on the basis of an exemplary embodiment thereof, the disclosure is not to be construed as being limited thereto. Various changes or modifications may be made to the embodiments without departing from the scope and spirit of the disclosure.

What is claimed is:

1. An electronic device capable of controlling light-emitting diodes (LEDs) to emit ultra bright light, the electronic device comprising:
    a power source configured for providing various voltages to components of the electronic device;
    a signal producing unit configured for providing an operational signal;
    a micro control unit (MCU) configured for outputting a normal brightness control signal and an ultra brightness control signal according to the operational signal and terminating the output of the ultra brightness control signal after a predetermined time;
    a pulse current controlling unit configured for controlling to output a first current according to the normal brightness control signal and the ultra brightness control signal and output a second current less than the first amount of current according to the normal brightness control signal after the ultra brightness control signal is terminated;
    a LED illuminator array comprising a plurality of LEDs connected in series and driven to emit light by the first amount of current and the second amount of current respectively.

2. The electronic device as claimed in claim 1, wherein the MCU comprises a timer which is configured for measuring an idle time during which no operational signal is received, and the MCU being configured for outputting a normal brightness control signal and an ultra brightness control signal according to the operational signal further comprises the MCU being configured for outputting the ultra brightness control signal in condition that the operational signal is received when the actual idle time measured by the timer has reached or exceeded a predetermined idle time.

3. The electronic device as claimed in claim 1, wherein the MCU further comprises a counter which is configured for counting a number of times of outputting the ultra brightness control signal during a predetermined time interval, and the MCU being configured for outputting a normal brightness control signal and a ultra brightness control signal according to the operational signal further comprises the MCU being configured for outputting the ultra brightness control signal on condition that the number of times counted by the counter is less than or equal to the predetermined number of times of outputting the ultra brightness control signal in the predetermined time interval.

4. The electronic device as claimed in claim 1, wherein the ultra brightness control signal is a high level signal.

5. The electronic device as claimed in claim 1, wherein the ultra brightness control signal is a pulse-width modification (PWM) signal.

6. The electronic device as claimed in claim 1, wherein the electronic device further comprises a feedback resistor, and the pulse current controlling unit comprises a first switch unit, a direct current to direct current (DC-DC) converting circuit, a second switch unit and a first resistor, the DC-DC converting circuit interconnects with the first switch unit and the second switch unit, the first resistor is connected in parallel with the feedback resistor when both the first switch unit and the second switch unit are turned on.

7. The electronic device as claimed in claim 6, wherein the first switch comprises a MOSFET and a BJT transistor, the source electrode of the MOSFET is connected to the power source, the drain electrode of the MOSFET is connected to the DC-DC converting circuit, and the gate electrode of the MOSEFT is connected to the collector of the BJT transistor, the emitter of the BJT transistor is connected to ground, the base of the BJT transistor is connected to the emitter of the BJT transistor, the normal brightness control signal is outputted to the base of the BJT transistor for controlling the BJT transistor to turn on and off alternately; the turning on and off of the BJT transistor turns on and off the MOSFET correspondingly.

8. The electronic device as claimed in claim 6, wherein the DC-DC converting circuit comprises a DC-DC converter, an inductor and a zener diode, the DC-DC converter comprises a voltage supply pin, a enable pin, a ground pin, a switch output pin, a overvoltage protect pin and a feedback pin, the voltage supply pin and the enable pin are both connected with the drain electrode of the MOSFET, the inductor is connected between the voltage supply pin and the anode of the zener diode, the cathode of the zener diode connects to input terminal of the LED illuminator array, the overvoltage protect pin is connected to the cathode of the zener diode, and the feedback pin is connected between the output terminal of the LED illuminator array and the feedback resistor.

9. The electronic device as claimed in claim 6, wherein the second switch unit comprises a MOSFET, the gate electrode and the source electrode of the MOSFET are both connected to ground, the drain electrode of the MOSFET is electrically connected between the output terminal of the LED illuminator array and the feedback resistor, the ultra brightness control signal is outputted to the gate electrode of the MOSFET for controlling the MOSFET to turn on and off alternately.

10. A method for controlling the brightness of a LED illuminator array of an electronic device, the method comprising:
   receiving an operational signal;
   outputting both a normal brightness control signal and an ultra brightness control signal according to the operational signal;
   outputting a first current according to the normal brightness control signal and the ultra brightness control signal;
   terminating the output of the ultra brightness control signal after a predetermined time; and
   outputting a second current less than the first amount of current according to the normal brightness control signal after the ultra brightness control signal is terminated.

11. The method as claimed in claim 10, further comprising: measuring an actual idle time of not receiving any operational signal before the operational signal receiving step, determining whether the actual idle time reaches or exceeds a predetermined idle time after the operational signal receiving step, and implementing the normal brightness control signal and ultra brightness control signal outputting step only when the actual idle time has reached or exceeded the predetermined idle time.

12. The method as claimed in claim 11, further comprising: determining whether an actual number of times of outputting the ultra brightness control signal reaches a predetermined number of times; and implementing the normal brightness control signal and ultra brightness control signal outputting step only when the actual number of times of outputting the ultra brightness control signal is less than the predetermined number of times of outputting the ultra brightness control signal.

* * * * *